US012386300B2

(12) United States Patent
Mizuno

(10) Patent No.: US 12,386,300 B2
(45) Date of Patent: Aug. 12, 2025

(54) TRANSPORT DEVICE THAT TRANSPORTS RECORDING MEDIUM, AND IMAGE FORMING APPARATUS INCLUDING SAME

(71) Applicant: KYOCERA Document Solutions Inc., Osaka (JP)

(72) Inventor: Masahiko Mizuno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/736,654

(22) Filed: Jun. 7, 2024

(65) Prior Publication Data

US 2024/0419115 A1 Dec. 19, 2024

(30) Foreign Application Priority Data

Jun. 15, 2023 (JP) ................................ 2023-098696

(51) Int. Cl.
*G03G 15/00* (2006.01)

(52) U.S. Cl.
CPC ......... *G03G 15/602* (2013.01); *G03G 15/607* (2013.01); *G03G 2215/00409* (2013.01)

(58) Field of Classification Search
CPC ............... G03G 15/602; G03G 15/607; G03G 2215/00409
See application file for complete search history.

(56) References Cited

U.S. PATENT DOCUMENTS

| | | | | |
|---|---|---|---|---|
| 5,852,764 A * | 12/1998 | Kida | G03G 15/6552 | 271/298 |
| 6,895,197 B2 * | 5/2005 | Shibata | G03G 15/50 | 399/82 |
| 2003/0016976 A1 * | 1/2003 | Harashima | G03G 15/6564 | 399/389 |
| 2007/0146457 A1 * | 6/2007 | Kito | B41J 11/0035 | 347/101 |
| 2012/0163859 A1 | 6/2012 | Hashimoto et al. | | |
| 2014/0199104 A1 * | 7/2014 | Ishikawa | G03G 15/6558 | 399/388 |
| 2021/0245529 A1 * | 8/2021 | Park | B41M 7/009 | |
| 2023/0174331 A1 * | 6/2023 | Naito | B65H 5/26 | 271/3.19 |

FOREIGN PATENT DOCUMENTS

| | | |
|---|---|---|
| JP | 5206781 B2 | 6/2013 |

* cited by examiner

*Primary Examiner* — David H Banh
(74) *Attorney, Agent, or Firm* — IP Business Solutions, LLC.

(57) ABSTRACT

A transport device includes a transport mechanism and a carry in/out mechanism. The transport mechanism transports a recording medium from inside of an image forming apparatus that forms an image on the recording medium, to outside of the image forming apparatus, and transports the recording medium carried in from the outside of the image forming apparatus, to the inside thereof. The carry in/out mechanism performs, in a linked manner, an operation including receiving the recording medium transported by the transport mechanism toward the outside, and further transporting the recording medium toward the outside of the image forming apparatus, and an operation including receiving the recording medium carried in from the outside, and further transporting the recording medium toward the transport mechanism.

5 Claims, 7 Drawing Sheets

TRANSPORT DEVICE THAT TRANSPORTS RECORDING MEDIUM, AND IMAGE FORMING APPARATUS INCLUDING SAME

INCORPORATION BY REFERENCE

This application claims priority to Japanese Patent Application No. 2023-098696 filed on Jun. 15, 2023, the entire contents of which are incorporated by reference herein.

BACKGROUND

The present disclosure relates to a transport device and an image forming apparatus.

A processing unit is known that suppresses a developing unit from wobbling, while maintaining the pressure of a developing roller against a photoconductor drum (photosensitive body) at an appropriate level. Such a processing unit uses a first pressure member and a second pressure member, to maintain the pressure of the developing roller at the appropriate level. In an image forming apparatus including such a processing unit, a processing device that, for example, dries a recording medium on which an image has been formed, may be provided.

SUMMARY

The disclosure proposes further improvement of the foregoing techniques.

In an aspect, the disclosure provides a transport device including a transport mechanism and a carry in/out mechanism. The transport mechanism transports a recording medium from inside of an image forming apparatus that forms an image on the recording medium, to outside of the image forming apparatus, and transports the recording medium carried in from the outside of the image forming apparatus, to the inside thereof. The carry in/out mechanism performs, in a linked manner, an operation including receiving the recording medium transported by the transport mechanism toward the outside, and further transporting the recording medium toward the outside of the image forming apparatus, and an operation including receiving the recording medium carried in from the outside, and further transporting the recording medium toward the transport mechanism.

In another aspect, the disclosure provides an image forming apparatus that forms an image on a recording medium. The image forming apparatus includes the transport device inside the image forming apparatus.

DETAILED DESCRIPTION

Figure 1:
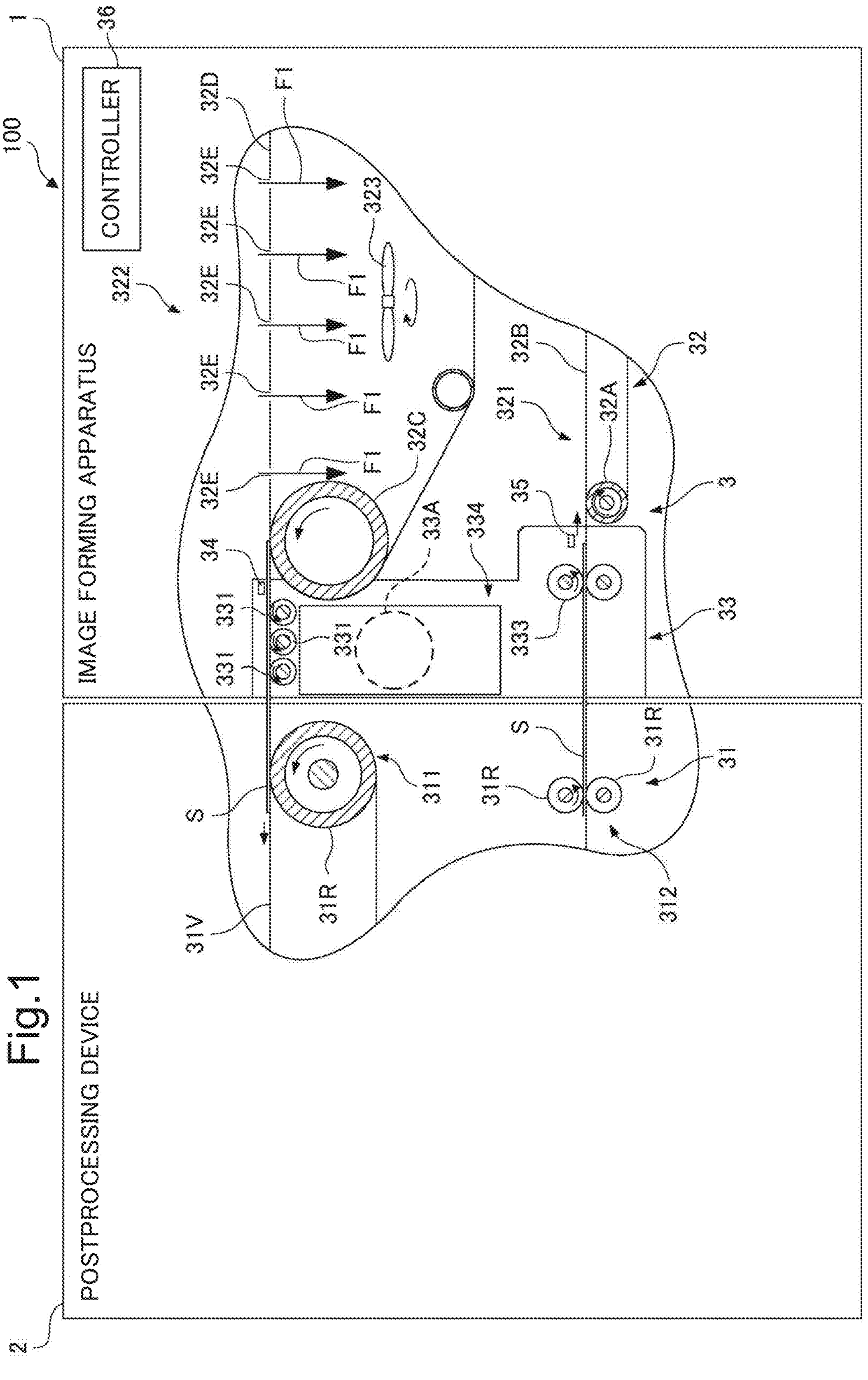
FIG. 1 is a schematic drawing showing an image forming system according to an embodiment of the disclosure.

Hereafter, a transport device and an image forming system according to an embodiment of the disclosure will be described, with reference to the drawings. In the drawings, the same or corresponding elements are given the same reference numeral, and the description of such elements will not be repeated.

Referring to FIG. 1, the outline of the image forming system 100 according to the embodiment will be described. FIG. 1 is a schematic drawing showing the image forming system 100 according to the embodiment of the disclosure.

The image forming system 100 includes, as shown in FIG. 1, an image forming apparatus 1, a postprocessing device 2, and a transport device 3.

The image forming apparatus 1 is configured to form an image on a recording medium, either by an electrophotographic method or an ink jet printing method. The image forming apparatus 1 may be, for example, a printer, a copier, or a multifunction peripheral (MFP). The image forming apparatus 1 shown in FIG. 1 represents an electrophotographic printer.

The image forming apparatus 1 forms, on the basis of image data, an image represented by image data on a sheet S (exemplifying the recording medium). The image forming apparatus 1 forms a toner image on the sheet S, for example by the electrophotographic method. Although not shown, the image forming apparatus 1 may form an image on the sheet S, by the ink jet printing method.

The postprocessing device 2 performs postprocessing on the sheet S, having an image formed thereon. The type of the postprocessing is specified as desired, depending on a position on the sheet S where the image is formed, or user's requirement about the picture quality of the image formed on the sheet S. Examples of the postprocessing include drying, reversing the sheet S, and forming a bundle of a plurality of sheets S.

The transport device 3 transports the sheet S (recording medium), from inside of the image forming apparatus 1, toward outside thereof. In this embodiment, the transport device 3 transports the sheet S to the postprocessing device 2 on the outside, and receives the sheet S carried in from the postprocessing device 2 on the outside. To be more specific, the transport device 3 transports the sheet S having an image formed thereon by the image forming apparatus 1, to inside of the postprocessing device 2. The sheet S transported into the inside of the postprocessing device 2 is again transported by the transport device 3, from the postprocessing device 2 into the inside of the image forming apparatus 1. In the subsequent description, the transport of the sheet S from the image forming apparatus 1, through the postprocessing device 2, and to the image forming apparatus 1 will be referred to as transport of the sheet S from an upstream side to a downstream side, for the sake of convenience in description. Alternatively, without distinction between the upstream side and the downstream side, the direction in which the sheet S is transported may be referred to as transport direction.

Figure 2:
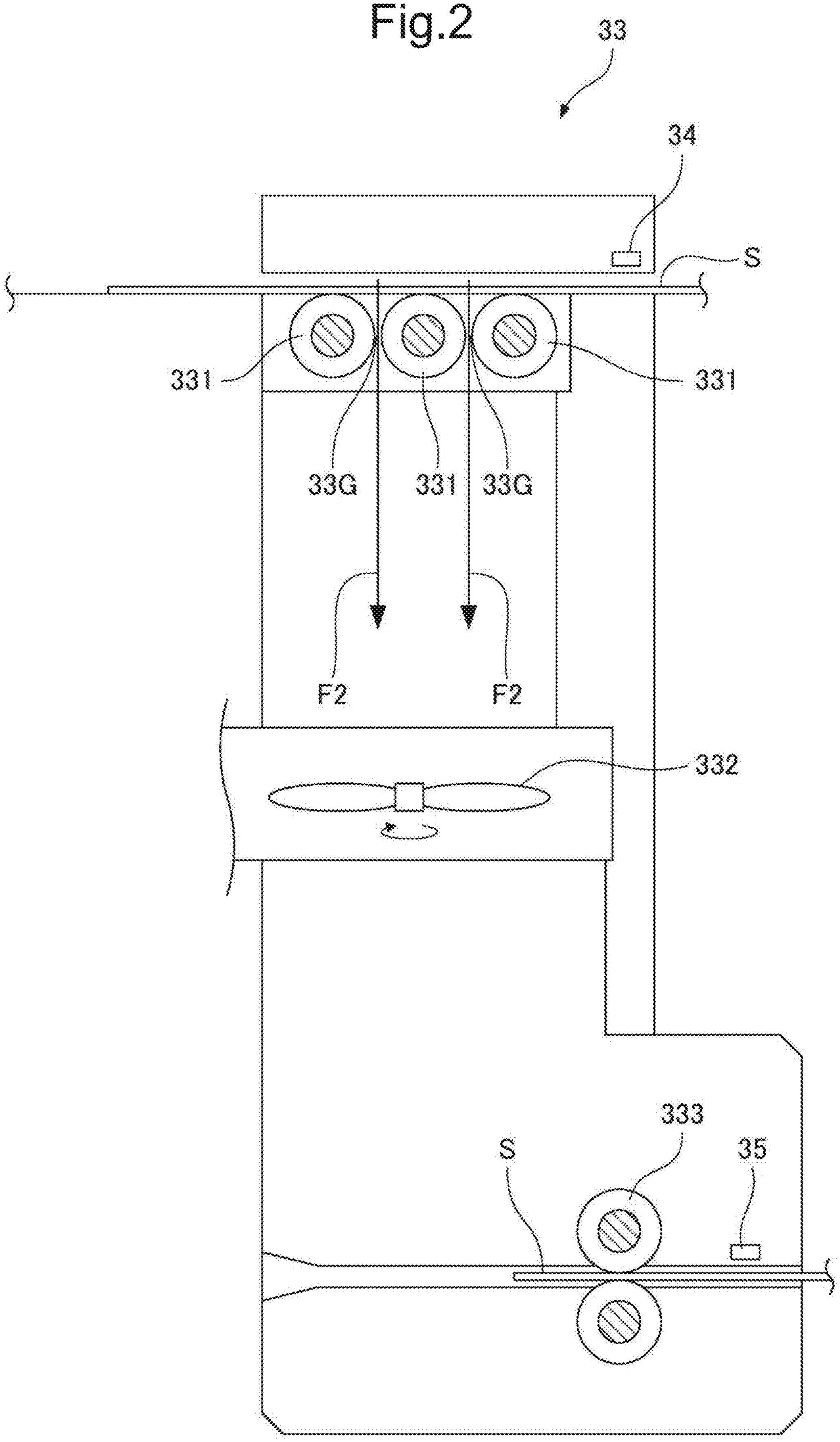
FIG. 2 is a schematic drawing showing the carry in/out mechanism shown in FIG. 1.
Figure 3:
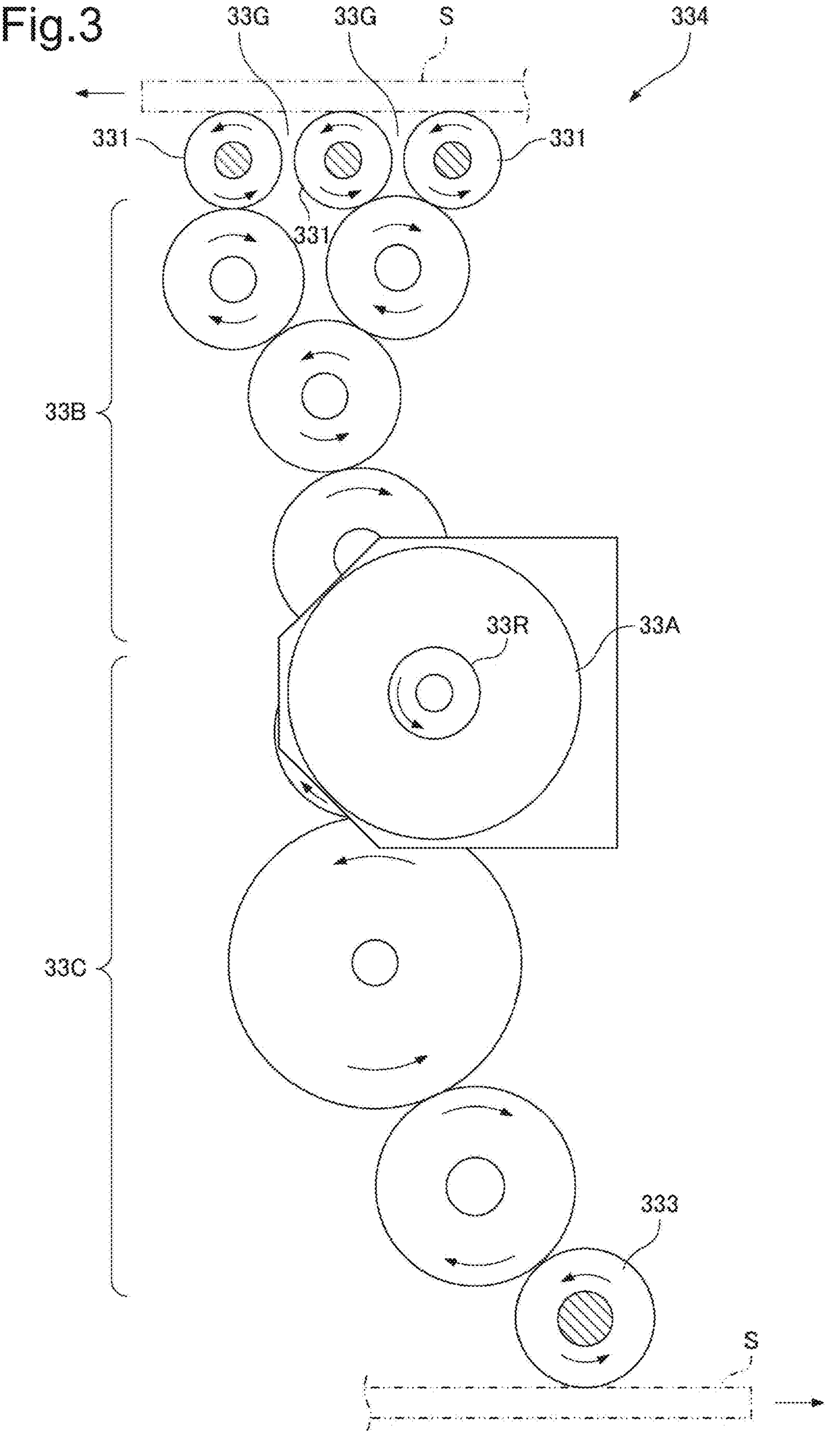
FIG. 3 is a schematic drawing showing a drive device that causes a carry-out roller and a carry-in roller to rotate.
Figure 4:
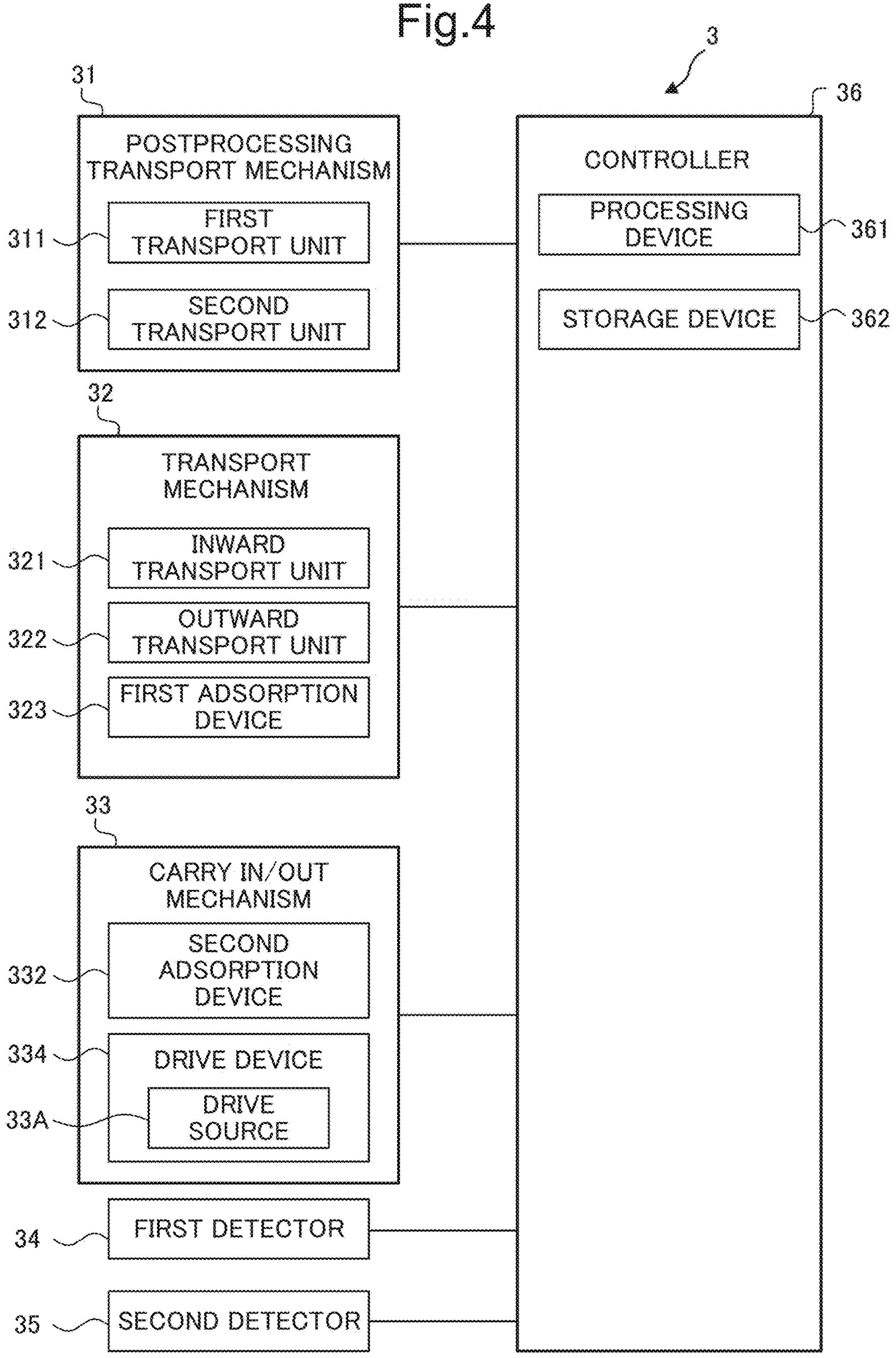
FIG. 4 is a block diagram showing a configuration of a transport device according to the embodiment of the disclosure.

Referring now to FIG. 1 to FIG. 4, the transport device 3 will be described in detail. FIG. 2 is a schematic drawing showing the carry in/out mechanism 33 shown in FIG. 1. FIG. 3 is a schematic drawing showing a drive device 334 that causes a carry-out roller 331 and a carry-in roller 333 to rotate. FIG. 4 is a block diagram showing a general configuration of the transport device 3 according to the embodiment of the disclosure.

The transport device 3 includes, as shown in FIG. 1, a postprocessing transport mechanism 31, a transport mechanism 32, a carry in/out mechanism 33, a first detector 34, a second detector 35, and a controller 36.

As an overview, the postprocessing transport mechanism 31, the transport mechanism 32, and the carry in/out mechanism 33 transport the sheet S. The postprocessing transport mechanism 31 is located inside the postprocessing device 2. The transport mechanism 32 is located inside the image forming apparatus 1.

The transport mechanism 32 transports the sheet S from the inside of the image forming apparatus 1 toward the postprocessing device 2 on the outside, and transports the sheet S carried in from the postprocessing device 2, on the outside of the image forming apparatus 1, into the inside of the image forming apparatus 1.

The carry in/out mechanism 33 receives and delivers the sheet S, between the postprocessing transport mechanism 31 and the transport mechanism 32.

The postprocessing transport mechanism 31 includes a first transport unit 311, and a second transport unit 312.

The first transport unit 311 receives the sheet S from the carry in/out mechanism 33. The first transport unit 311 includes a roller 31R and a belt 31V. The roller 31R makes the belt 31V revolve. The sheet S delivered from the carry in/out mechanism 33 is placed on the revolving belt 31V. The sheet S placed on the belt 31V is transported by the revolution thereof, from the upstream side to the downstream side, inside the postprocessing device 2.

The second transport unit 312 delivers the sheet S transported inside the postprocessing device 2, to the carry in/out mechanism 33. The second transport unit 312 includes a pair of rollers 31R, 31R. The sheet S is pinched between the pair of rollers 31R, 31R. The pinched sheet S is transported by the rotation of the pair of rollers 31R, 31R, from the upstream side to the downstream side, inside the postprocessing device 2.

The transport mechanism 32 transports the sheet S into the inside and toward the outside of the image forming apparatus 1. The sheet S is delivered to the carry in/out mechanism 33, from the transport mechanism 32. In other words, the carry in/out mechanism 33 performs, in a linked manner, an operation including receiving the sheet S transported by the transport mechanism 32 toward the postprocessing device 2 on the outside, and further transporting the sheet S toward the postprocessing device 2 located outside of the image forming apparatus, and an operation including receiving the sheet S carried in from the postprocessing device 2 on the outside, and further transporting the sheet S toward the transport mechanism 32.

The transport mechanism 32 includes an inward transport unit 321, an outward transport unit 322, and a first adsorption device 323.

The inward transport unit 321 transports the sheet S toward the inside of the image forming apparatus 1. To be more specific, the inward transport unit 321 transports the sheet S received from the carry in/out mechanism 33, toward the inside of the image forming apparatus 1. The inward transport unit 321 includes an inward roller 32A and an inward belt 32B. The inward roller 32A makes the inward belt 32B revolve. The sheet S delivered from the carry in/out mechanism 33 is placed on the revolving inward belt 32B. The sheet S placed on the inward belt 32B is transported by the revolution of the inward belt 32B, from the upstream side to the downstream side, inside the image forming apparatus 1.

The outward transport unit 322 transports the sheet S toward the outside of the image forming apparatus 1. To be more specific, the outward transport unit 322 delivers the sheet S transported inside the image forming apparatus 1, to the carry in/out mechanism 33. The outward transport unit 322 includes an outward roller 32C and an outward belt 32D. The outward roller 32C makes the outward belt 32D revolve. The sheet S is placed on the revolving outward belt 32D, to be transported inside the image forming apparatus 1. The outward belt 32D includes a plurality of small-sized opening 32E, located with an interval between each other.

The first adsorption device 323 adsorbs the sheet S to the outward transport unit 322. By doing so, the first adsorption device 323 prevents the sheet S from migrating in an unintended direction, while the sheet S is being transported in the outward transport unit 322. The first adsorption device 323 may be, for example, a fan that sucks the sheet S toward the outward belt 32D. The first adsorption device 323 configured as above is located on the opposite side of the sheet S, across the outward belt 32D. The first adsorption device 323 generates an airflow F1 that flows from the space where the sheet S is located, toward the first adsorption device 323 through the openings 32E of the outward belt 32D. By the airflow F1 generated by the first adsorption device 323, the sheet S is adsorbed to the outward belt 32D.

The carry in/out mechanism 33 delivers the sheet S to the transport mechanism 32 (carry-in operation), which transports the sheet S toward the inside of the image forming apparatus 1, in linkage with an operation of receiving the sheet S from the transport mechanism 32 (carry-out operation), which transports the sheet S toward the outside of the image forming apparatus 1. The carry in/out mechanism 33 thus configured performs the carry-in operation and the carry-out operation, using a single drive source. Therefore, the structure of the carry in/out mechanism 33 can be simplified, compared with the case where a plurality of drive sources are required.

To be more specific, as shown in FIG. 1 to FIG. 3, the carry in/out mechanism 33 includes carry-out rollers 331, a second adsorption device 332 (see FIG. 2), a carry-in roller 333, and a drive device 334 (see FIG. 3).

The carry-out rollers 331 serve to draw out the sheet S from the transport mechanism 32. As shown in FIG. 1, the carry-out rollers 331 are aligned on the downstream side of the outward transport unit 322, with a clearance that allows the sheet S to stride over. As shown in FIG. 2, three carry-out rollers 331, 331, 331 are aligned along the transport direction, with a clearance 33G. The sheet S delivered to the carry-out roller 331 is placed on the rotating carry-out roller 331, to be carried out from the image forming apparatus 1. The sheet S carried out from the image forming apparatus 1 is delivered to the first transport unit 311, by the carry-out roller 331.

The second adsorption device 332 adsorbs the sheet S to the carry-out rollers 331, as shown in FIG. 2. By doing so, the second adsorption device 332 prevents the sheet S, being transported by the carry-out rollers 331, from migrating in an unintended direction. To be more specific, the second adsorption device 332 may be, for example, a fan that sucks the sheet S toward the carry-out rollers 331. The second adsorption device 332 is located on the opposite side of the sheet S, across the carry-out rollers 331. The second adsorption device 332 generates an airflow F2 that flows from the space where the sheet S is located, toward the second adsorption device 332 through the clearance 33G. By the airflow F2 generated by the second adsorption device 332, the sheet S is adsorbed to the carry-out rollers 331.

The carry-in roller 333 delivers the sheet S to the transport mechanism 32, as shown in FIG. 1. To be more specific, the carry-in roller 333 is located on the upstream side of the inward transport unit 321, with a clearance therefrom. The sheet S delivered to the carry-in roller 333 from the second transport unit 312 is delivered to the inward transport unit 321, by the rotating carry-in roller 333. As result, the sheet S transported by the carry-in roller 333 is delivered to the inside of the image forming apparatus 1.

The drive device 334 drives the carry-out roller 331 and the carry-in roller 333 in linkage with each other, as shown in FIG. 3. With such a configuration, the carry-out roller 331 and the carry-in roller 333 are made to rotate by the single drive device 334. Therefore, the structure of the carry in/out mechanism 33 can be simplified, compared with the case where a plurality of drive sources 334 are required to drive the carry in/out mechanism 33.

To be more specific, the drive device 334 includes a drive source 33A, a first transmission unit 33B, and a second transmission unit 33C.

The drive source 33A generates the rotational force for rotating the carry-out roller 331 and the carry-in roller 333. The drive source 33A shown in FIG. 3 is a motor having a rotary shaft 33R.

The first transmission unit 33B serves to transmit the rotational force of the drive source 33A to the carry-out rollers 331. The first transmission unit 33B shown in FIG. 3 includes a gear train composed of a plurality of gears meshed with each other. The gear train of the first transmission unit 33B transmits the rotational force of the rotary shaft 33R to the carry-out roller 331. Accordingly, the carry-out roller 331 rotates interlocked with the rotation of the rotary shaft 33R. Here, the first transmission unit 33B may have a different structure, without limitation to the gear train, provided that the structure is capable of transmitting the rotational force of the drive source 33A to the carry-out roller 331.

The second transmission unit 33C serves to transmit the rotational force of the drive source 33A to the carry-in roller 333. The second transmission unit 33C shown in FIG. 3 includes, like the first transmission unit 33B, a gear train composed of a plurality of gears meshed with each other. The gear train of the second transmission unit 33C transmits the rotational force of the rotary shaft 33R to the carry-in roller 333. Accordingly, the carry-in roller 333 rotates interlocked with the rotation of the rotary shaft 33R. Here, the second transmission unit 33C may also have a different structure, without limitation to the gear train, provided that the structure is capable of transmitting the rotational force of the drive source 33A to the carry-in roller 333.

As described above, the rotational force of the rotary shaft 33R is transmitted to both of the first transmission unit 33B and the second transmission unit 33C. Therefore, the rotation of the rotary shaft 33R causes the carry-in roller 333 and the carry-out roller 331 to rotate, in linkage with each other.

An abnormality may occur in the image forming apparatus 1 shown in FIG. 1, during the image forming operation. The abnormality of the image forming apparatus 1 disables the image forming apparatus 1 from continuing with the normal operation. Specific examples of the abnormality of the image forming apparatus 1 include shortage of the sheets S on which the image is to be formed, and shortage of ink or toner. The occurrence of such abnormality of the image forming apparatus 1 is detected by the controller 36, on the basis of, for example, an output from a sheet sensor provided on the non-illustrated sheet cassette, or a toner sensor provided on a toner cartridge container.

The first detector 34 detects the presence of the sheet S, carried out by the carry in/out mechanism 33 from the transport mechanism 32. To be more detailed, the first detector 34 may be, for example, an optical sensor that detects that at least a part of the sheet S has moved away from the outward belt 32D. As a specific example, the first detector 34 is an optical sensor that detects the presence of the sheet S, in the space between the outward belt 32D and the carry-out roller 331. Alternatively, the first detector 34 may be constituted of a combination of a position sensor for detecting the presence of the sheet S at a desired position, and a processing device that predicts the position of the sheet S, on the basis of the detection result from the position sensor and the operation status of each component of the image forming system 100.

The second detector 35 detects the presence of the sheet S, carried in by the carry in/out mechanism 33 to the transport mechanism 32. To be more detailed, the second detector 35 may be, for example, an optical sensor that detects the presence of the sheet S being transported inside the postprocessing device 2, and the sheet S delivered from the carry-in roller 333 to the inward roller 32A. The second detector 35 may be the combination of the position sensor and the processing unit, described with reference to the first detector 34. Here, the first detector 34 and the second detector 35 are not limited to the position sensor, or the combination of the position sensor and the processing unit, provided that the sensor is capable of detecting the position of the sheet S.

Referring to FIG. 4, the controller 36 controls the postprocessing transport mechanism 31, the transport mechanism 32, and the carry in/out mechanism 33. Preferably, the controller 36 may control the first adsorption device 323 and the outward transport unit 322, on the basis of the detection result from the first detector 34. In addition, the controller 36 controls the drive device 334, on the basis of the detection result from the second detector 35. Therefore, the first adsorption device 323, the outward transport unit 322, and the drive device 334 each perform an operation appropriate for the position where the sheet S is located, when the abnormality occurs in the image forming apparatus 1. The controller 36 includes a processing device 361 and a storage device 362.

The controller 36 includes, for example, a processor. The processor may be, for example, a central processing unit (CPU). The controller 36 controls the first transport unit 311, the second transport unit 312, the inward transport unit 321, the outward transport unit 322, the first adsorption device 323, the drive device 334, and the second adsorption device 332, by executing control programs stored in the storage device 362. In addition, the controller 36 acts as the processing device 361, by executing the control program.

The storage device 362 contains the control programs. The storage device 362 is, for example, constituted of a read-only memory (ROM), a random-access memory (RAM), and/or a solid-state drive (SSD), incorporated in the controller 36. The storage device 362 may include an external memory. The external memory refers to, for example, a removable medium. The storage device 362 may include, for example, a universal serial bus (USB) memory, and/or a secure digital (SD) card, as the external memory.

Figure 5:
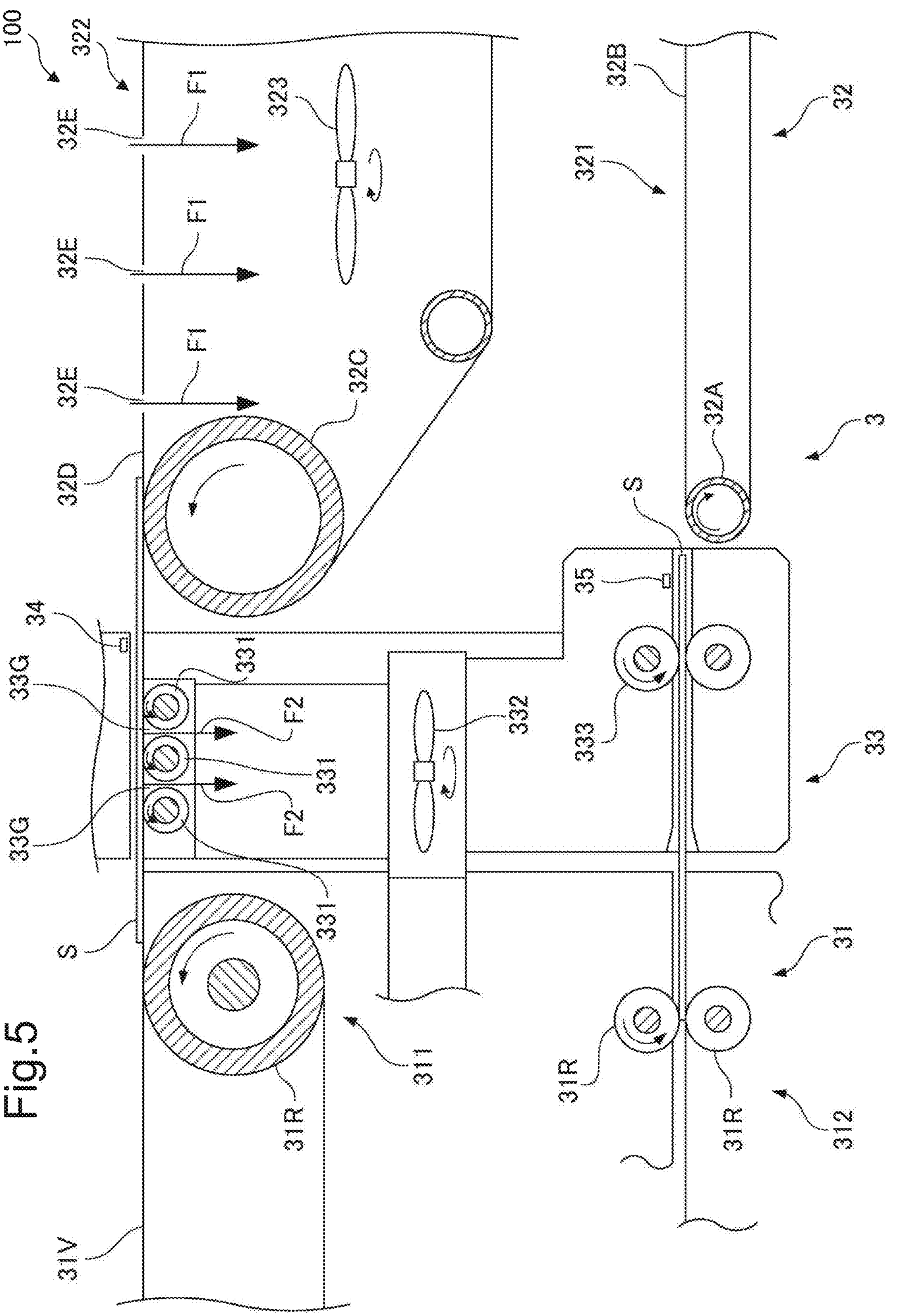
FIG. 5 is a schematic drawing for explaining an operation of the image forming system according to the embodiment of the disclosure.
Figure 6:
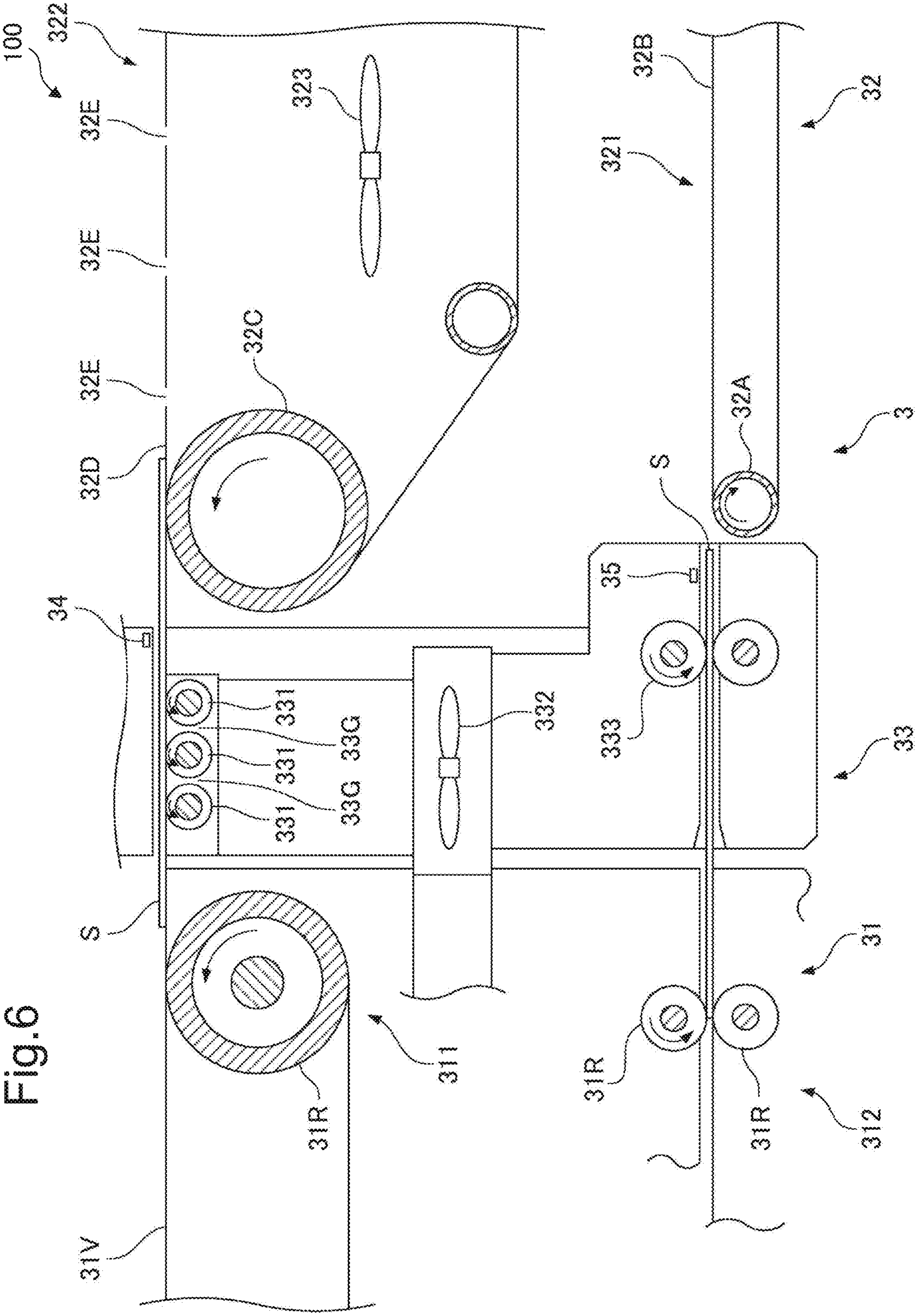
FIG. 6 is another schematic drawing for explaining the operation of the image forming system according to the embodiment of the disclosure, and showing an operation of the transport device, performed when a first detector and a second detector detects a sheet.
Figure 7:
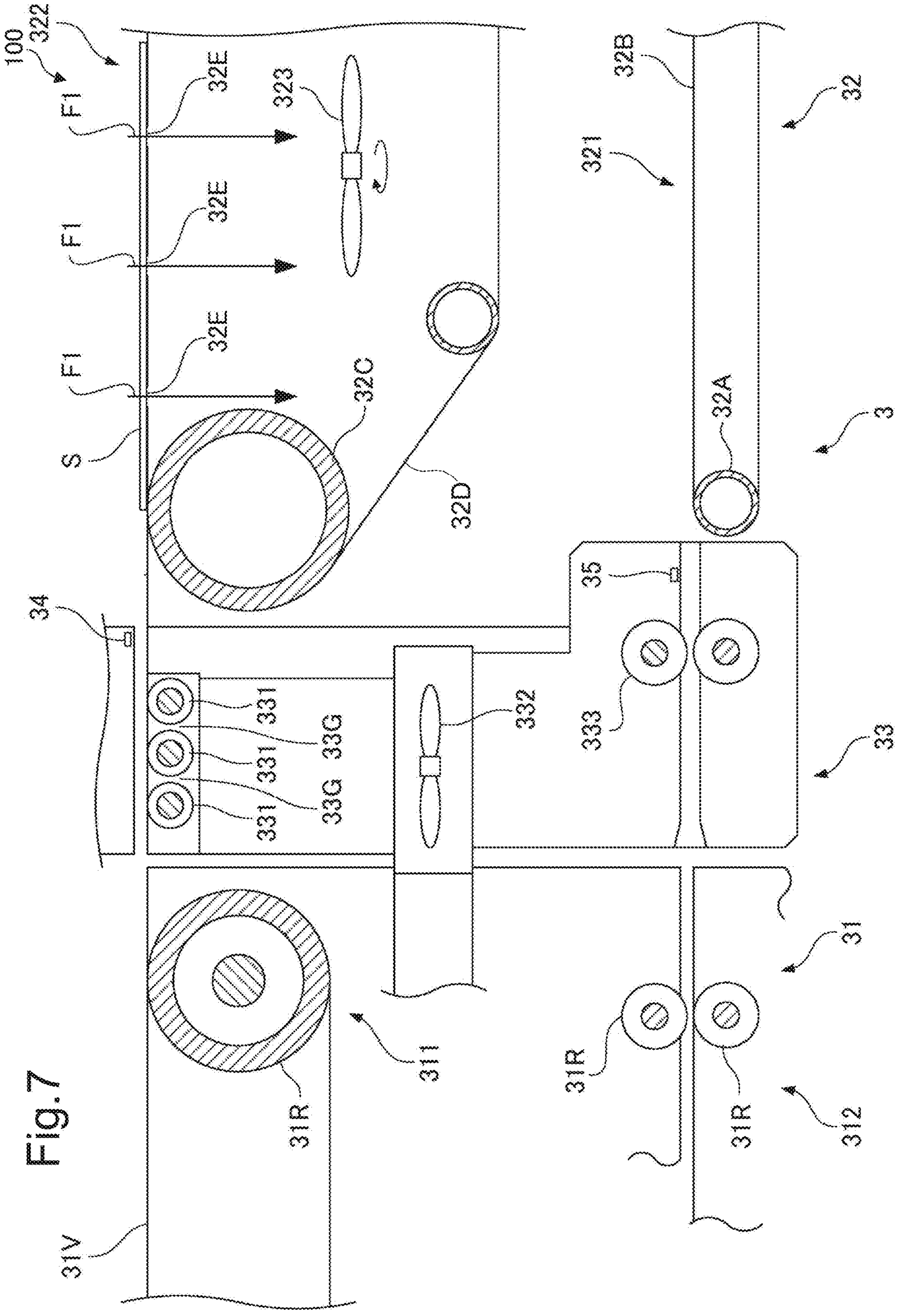
FIG. 7 is another schematic drawing for explaining the operation of the image forming system according to the embodiment of the disclosure, and showing an operation of the transport device, performed when an abnormality occurs in the image forming apparatus, and the first detector and the second detector no longer detect the sheet.

The function of the controller 36 will be described hereunder, with reference to FIG. 4 to FIG. 7. FIG. 5 is a schematic drawing for explaining an operation of the image forming system 100 according to the embodiment. FIG. 6 is another schematic drawing for explaining the operation of the image forming system 100 according to the embodiment, and showing an operation of the transport device 3, performed when the first detector 34 and the second detector 35 have detected the sheet. FIG. 7 is another schematic drawing for explaining the operation of the image forming system 100 according to the embodiment, and showing an operation of the transport device 3, performed when an abnormality occurs in the image forming apparatus 1, and the first detector 34 and the second detector 35 do not detect the sheet.

The controller 36 activates the first transport unit 311, the second transport unit 312, the inward transport unit 321, the outward transport unit 322, and the drive source 33A. Accordingly, as shown in FIG. 5, the sheet S transported by the outward transport unit 322 is carried out by the carry-out roller 331, and delivered to the first transport unit 311. The sheet S delivered to the first transport unit 311 is transported through inside of the postprocessing device 2, and then delivered from the second transport unit 312 to the inward transport unit 321, via the carry-in roller 333.

In addition, the controller 36 controls the first adsorption device 323 and the second adsorption device 332, so as to adsorb the sheet S to the outward transport unit 322, with a force weaker than the force necessary for carrying out the sheet S from the transport mechanism 32. More specifically, as shown in FIG. 5, the controller 36 controls the first adsorption device 323 and the second adsorption device 332, such that the air volume of the airflow F1 generated by the first adsorption device 323 becomes smaller than that of the airflow F2 generated by the second adsorption device 332. As result, the sheet S can be exempted from being subjected to an excessive tensile force, when being delivered from the outward transport unit 322 to the carry-out roller 331, and prevented from being damaged.

When the sheet S is carried out to the postprocessing device 2, the controller 36 operates the outward transport unit 322 as shown in FIG. 6. More specifically, the controller 36 controls the rotation of the outward roller 32C, so as to revolve the outward belt 32D. Accordingly, the sheet S on the outward belt 32D is transported toward the outside of the image forming apparatus 1. With the lapse of time, the sheet S being transported by the outward belt 32D is carried out from the image forming apparatus 1. As result, the first detector 34 ceases to detect the sheet S.

The sheet S carried out from the image forming apparatus 1 by the outward belt 32D is carried into the postprocessing device 2. In the case where the controller 36 is operating the first transport unit 311, the second transport unit 312, and the drive device 334, the sheet S transported inside the postprocessing device 2 is carried into the carry in/out mechanism 33, from the second transport unit 312. As result, the second detector 35 detects the sheet S.

Further, the controller 36 operates the drive device 334. In other words, the controller 36 causes the drive source 33A to output the rotational force, so that the carry-out roller 331 and the carry-in roller 333 are made to rotate. Accordingly, the sheet S caught by the carry-in roller 333 is transported toward the outside of the postprocessing device 2, in other words toward the inside of the image forming apparatus 1.

When an abnormality occurs in the image forming apparatus 1, the controller 36 allows the first transport unit 311, the second transport unit 312, and the inward transport unit 321 to operate, while the second detector 35 is detecting the sheet S. When the second detector 35 ceases to detect the sheet S, the controller 36 stops the operation of the first transport unit 311, the second transport unit 312, and the inward transport unit 321. Thus, the sheet S located inside the postprocessing device 2 is carried out from the postprocessing device 2 and the carry in/out mechanism 33. Therefore, when an abnormality occurs in the image forming apparatus 1, the sheet S being transported does not remain inside the postprocessing device 2, but is carried into the image forming apparatus 1.

Referring to FIG. 7, in the case where an abnormality occurs in the image forming apparatus 1, the controller 36 stops the operation of the outward transport unit 322, and causes the first adsorption device 323 to operate, when the first detector 34 detects the leading edge of the sheet S. More specifically, the controller 36 stops the rotation of the outward roller 32C, thereby stopping the revolution of the outward belt 32D. In addition, the controller 36 causes the first adsorption device 323 to generate the airflow F1. More preferably, the controller 36 may control the drive device 334 so as to stop the rotation of the carry-out roller 331, and to stop the operation of the second adsorption device 332. Accordingly, delivery of an additional sheet S to the carry-out roller 331 is prevented. Further, since the first adsorption device 323 generates the airflow F1, the sheet S on the outward transport unit 322 is adsorbed to the outward belt 32D. As result, the sheet S on the outward belt 32D is restricted from proceeding toward the postprocessing device 2.

Further, when an abnormality occurs in the image forming apparatus 1, the controller 36 may stop the outward transport unit 322 and activate the first adsorption device 323 as above, also when the leading edge of the sheet S is not detected by the first detector 34. In this case also, it is more preferable that the controller 36 controls the drive device 334 so as to stop the rotation of the carry-out roller 331, and the operation of the second adsorption device 332.

The mentioned operation allows the sheet S to remain inside the image forming apparatus 1, without being transported to the postprocessing device 2, when an abnormality occurs in the image forming apparatus 1.

In the case of the aforementioned existing image forming apparatus, since the first pressure member and the second pressure member are provided, the mechanism for transporting the recording medium has a complicated structure. In addition, when an error occurs in such image forming apparatus during the image forming operation on the recording medium, it is difficult to remove the sheet from the processing device, and smoothly prevent an additional recording medium from being introduced into the processing device.

According to the foregoing embodiment, in contrast, since the drive device 334 is employed, the sheet S can be transported between the image forming apparatus 1 and the postprocessing device 2, with a simplified structure. According to the embodiment, further, the controller 36 performs the operation as described above, when an abnormality occurs in the image forming apparatus 1. Therefore, even though an error occurs during the image forming operation on the sheet S, the sheet S can be removed from the postprocessing device 2, and an additional sheet S can be smoothly prevented from being carried into the postprocessing device 2.

The embodiment of the disclosure has been described as above, with reference to the drawings. However, the disclosure is not limited to the foregoing embodiment, but may be modified in various manners, without departing from the scope of the disclosure. The drawings each schematically illustrate the elements for the sake of clarity, and the thickness, length, number of pieces, and interval of the illustrated elements may be different from the actual ones, because of the convenience in making up the drawings. Further, the material, shape, and size of the elements referred to in the foregoing embodiment are merely exemplary and not specifically limited, and may be modified as desired, without substantially departing from the configuration according to the disclosure.

INDUSTRIAL APPLICABILITY

The disclosure provides the transport device and the image forming system, and is therefore industrially applicable.

What is claimed is:

1. A transport device comprising:

a transport mechanism that transports a recording medium from inside of an image forming apparatus that forms an image on the recording medium, to outside of the image forming apparatus, and transports the recording medium carried in from the outside of the image forming apparatus, to the inside thereof; and a carry in/out mechanism that performs, in a linked manner, an operation including receiving the recording medium transported by the transport mechanism toward the outside, and further transporting the recording medium toward the outside of the image forming apparatus, and an operation including receiving the recording medium carried in from the outside, and further transporting the recording medium toward the transport mechanism, wherein the carry in/out mechanism includes:

a carry-out roller that receives the recording medium from the transport mechanism and carries out the recording medium;

a carry-in roller that receives the recording medium from outside of the image forming apparatus, and carries the recording medium into the transport mechanism; and a drive device that drives the carry-out roller and the carry-in roller in linkage with each other, wherein the transport mechanism includes:

an outward transport unit that transports the recording medium toward the outside of the image forming apparatus, via the carry in/out mechanism; and a first adsorption device that adsorbs the recording medium to the outward transport unit, wherein, when an abnormality occurs in the image forming apparatus, the first adsorption device adsorbs the recording medium to the outward transport unit, with a force greater than a force by which the carry in/out mechanism carries out the recording medium from the transport mechanism.

2. The transport device according to claim 1, further comprising:

a second adsorption device provided inside the image forming apparatus at a position downstream of the first adsorption device in a transport direction of the recording medium toward the outside, and configured to adsorb the recording medium to the carry-out roller; and a controller that controls operation of the carry in/out mechanism, the first adsorption device, and the second adsorption device, wherein, when an abnormality occurs in the image forming apparatus, the controller causes the outward transport unit to stop transporting the recording medium, the first adsorption device to operate, and the second adsorption device to stop operating.

3. The transport device according to claim 1, further comprising:

a first detector that detects presence of the recording medium being carried out by the carry in/out mechanism from the transport mechanism;

a second detector that detects presence of the recording medium being carried by the carry in/out mechanism into the transport mechanism; and a controller that controls the adsorption device and the outward transport unit, on a basis of a detection result from the first detector, and controls the drive device, on a basis of a detection result from the second detector, when an abnormality occurs in the image forming apparatus.

4. The transport device according to claim 3, wherein the controller activates the drive device, when the second detector detects the recording medium.

5. An image forming apparatus that forms an image on a recording medium, the image forming apparatus comprising the transport device according to claim 1, the transport device being incorporated inside the image forming apparatus.

* * * * *